Patented Oct. 5, 1937

2,094,947

UNITED STATES PATENT OFFICE 2,094,947

COMPOSITION OF MATTER AND METHOD OF PRODUCING

Irvin W. Humphrey, Wilmington, Del., assignor to Hercules Powder Company, Wilmington, Del., a corporation of Delaware No Drawing. Application November 28, 1932, Serial No. 644,685

19 Claims. (Cl. 260—8)

This invention relates to a new composition of matter and method for its production. The new composition of matter contemplated by this invention comprises more particularly a reaction product formed by the reaction of a terpene alcohol containing a tertiary hydroxyl group with maleic anhydride. The reaction, for example, is believed to be in effect a condensation of a terpene alcohol containing a tertiary hydroxyl group and maleic anhydride, reaction occurring at their double bonds.

The new composition of matter contemplated by this invention will comprise essentially a condensation product of a terpene alcohol containing a tertiary hydroxyl group and maleic anhydride. The new composition, it is believed, will have the empirical formula $C_{14}H_{18}O_3$.

The new composition contemplated by this invention in crude form will be resinous, but may be readily purified, as, for example, by steam distillation, or by distillation under reduced pressure, and after purification will be found to be a white, waxy solid with crystalline properties. The new composition may be found to be of an acidic character, to have a saponification number of about 430-460 and to be capable of reacting with alcohols, such as methyl, ethyl, butyl, propyl, amyl, abietyl, stearol, ethylene glycol, propylene glycol, diethylene glycol, ethylene glycol monomethyl ether, benzyl, glycerol, etc. Modifying agents may be added such as rosin, hydrogenated rosin, stearic acid, succinic acid, oleic, sebasic acid, phthalic acid, drying oils, as linseed oil or China-wood oil or their fatty acids, etc., for the production of resinous products variously adaptable for use in the commercial arts.

In the practical adaptation of the method in accordance with this invention, the terpene alcohol containing a tertiary hydroxyl group, will be desirably reacted with maleic anhydride in about molar proportions, though it will be understood that an excess of either the terpene alcohol or the maleic anhydride may be used, the excess being recovered after completion of the reaction.

The reaction will be preferably effected in the presence of heat and may be effected in the presence of a suitable catalyst. If desired, the reaction may be carried out in the presence of a suitable agent, which will assist in the removal of water of reaction, the formation of water being one of the steps in the condensation reaction.

In the practical adaptation of this invention, the terpene alcohol containing a tertiary hydroxyl group may be, for example, a terpineol, as alpha-terpineol, a terpin, beta-terpineol, gamma-terpineol, terpinenol-1, terpinenol-4, etc., or other reactive tertiary terpene alcohol. Further, the terpene alcohol may be technical terpineol or as present in pine oil or in certain essential oils.

In carrying out the method for the production of the new composition maleic anhydride as such may be used or equivalently, one may use maleic or fumaric acid, which under the proper reaction conditions will be converted into maleic anhydride for reaction with the terpene alcohol.

A suitable catalyst may on occasions be used for promoting the reaction, though it will be understood that the use of a catalyst is generally unnecessary and may even be undesirable. If a catalyst is used such may be, for example, zinc chloride, aluminum chloride, p-toluene sulphonic acid, etc., may be used. Where it is desired to use an agent to aid in the removal of water of reaction, for example, xylene or toluene may be used.

In carrying out the method the terpene alcohol and maleic anhydride will be reacted in molar proportions, though, as has been indicated, excess of either of the reactants may be used, excess being recovered on completion of the reaction. The reaction will desirably be carried out in the presence of heat say, for example, at a temperature within about the range 100-200° C. Where a catalyst is used, such may be used in amount within the range say about 1-5% of the amount of maleic anhydride employed. Where an agent is used to aid in removal of water of reaction, such may be used in any suitable amount. It will be understood, of course, that particular temperatures and proportions of reactants, amount of agent aiding in the elimination of water of reaction, etc., are not of the essence of this invention, but will be dictated by good practice. As illustrative of the carrying out of the method in accordance with this invention for the production of the new composition with the use of, for example, alpha-terpineol as the terpene alcohol, one may proceed as follows:

About 154 parts of alpha-terpineol and 98 parts of maleic anhydride are heated together at a temperature of 125-135° C. for three to four hours. At the end of the heating period the volatile portions of the reaction mixture may be removed by steam distillation and the non-aqueous residue dried if desired. The drying of the non-aqueous residue may be accomplished by suitable heating or with the use of calcium chloride, sodium sulphate, or the like. The crude product, thiocyanate value 2.3, obtained may be refined for the obtaining of a very light colored product in the nature of a waxy solid having crystalline properties by partially distilling the treated residue at a temperature of about 140–150° C. under pressure of about 1–2 mm. Hg.

If desired, in following the procedure of this example, xylene may be used in the amount of about 150 parts to aid in the removal of water.

As a further illustration of the carrying out of the method of this invention, for example, a mixture of about 50 parts of terpin, 29 parts of maleic anhydride and 50 parts of xylene is distilled in such manner as to remove the water formed in the reaction and return the non-aqueous material to the reaction mass. When the reaction is complete the volatile materials are removed by distillation with steam and the non-aqueous residue dried as described above.

On distilling at a temperature of 140–150° C. under a pressure of 2 mm. mercury the product will be of a light color and of the nature of a waxy solid having crystalline properties.

As a further illustration, for example, pine oil is heated with about 70% of its weight of maleic anhydride for a preliminary period at a temperature of about 110–120° C. and then for several hours at a temperature of about 150–175° C. The terpineol contained in the pine oil will condense with the maleic anhydride, while most of the secondary alcohols, as borneol and fenchyl alcohol, will form acid maleates. On completion of the reaction the non-reactive pine oil components may be removed by distillation under reduced pressure or by direct steam distillation. The product will be a soft resinous acidic product which may be esterified with alcohols with or without a modifying agent. Likewise, if desired, one may use, for example, a pine oil cut rich in alpha-terpineol, as a cut boiling, for example, at 215–220° C.

In the reaction of maleic anhydride with pine oil the maleic anhydride will react with the alpha-terpineol of the pine oil and with certain other tertiary alcohols which may be present to form a resinous product. The maleic anhydride will react with the secondary alcohols, as borneol and fenchyl alcohol, which are present to form acid maleates, the reaction with the secondary alcohols being partial or complete depending upon the temperature employed, proportion of maleic anhydride, etc.

It will be appreciated that from the broad standpoint this invention contemplates from the product standpoint the composition resultant from the reaction of a terpene alcohol and maleic anhydride and contemplates from the method standpoint the reaction of a terpene alcohol and maleic anhydride.

It will be understood that in detailing practical procedure by way of illustrating the carrying out of the method in accordance with this invention, it is not intended that the details given shall restrict the invention from either the process or the product standpoint. It will be appreciated that various modifications of the method and product outlined herein for illustrative purposes may be made without departing from the scope of the invention.

It will be understood that in proceeding in accordance with this invention maleic acid or fumaric acid or mixtures thereof may be used in some instances equivalently for maleic anhydride.

What I claim and desire to protect by Letters Patent is:—

1. The method for producing a new composition of matter which includes reacting components consisting of a terpene alcohol containing a tertiary hydroxyl group and maleic anhydride in the presence of a catalyst selected from the group consisting of zinc chloride, aluminum chloride and p-toluene sulfonic acid.

2. The method for producing a new composition of matter which includes reacting components consisting of a terpene alcohol containing a tertiary hydroxyl group and maleic anhydride in the presence of heat and a catalyst selected from the group consisting of zinc chloride, aluminum chloride and p-toluene sulfonic acid.

3. The method for producing a new composition of matter which includes reacting components consisting of alpha-terpineol and maleic anhydride in the presence of heat and a catalyst selected from the group consisting of zinc chloride, aluminum chloride and p-toluene sulphonic acid.

4. A synthetic resin formed by the reaction of an alcohol with the condensation product of maleic anhydride and a terpene alcohol containing a tertiary hydroxyl group.

5. A synthetic resin formed by the reaction of a polyhydric alcohol with the condensation product of maleic anhydride and a terpene alcohol containing a tertiary hydroxyl group.

6. A synthetic resin formed by the reaction of the condensation product of maleic anhydride and a terpene alcohol containing a tertiary hydroxyl group with a polyhydric alcohol and a modifying agent selected from the group consisting of organic acids, natural resins and glyceride oils.

7. A synthetic resin formed by the reaction of an alcohol with the condensation product of maleic anhydride and alpha-terpineol.

8. A synthetic resin formed by the reaction of a polyhydric alcohol with the condensation product of maleic anhydride and alpha-terpineol.

9. The method of producing a synthetic resin which comprises first reacting components consisting of maleic anhydride and a terpene alcohol containing a tertiary hydroxyl group, and then reacting the condensation product so formed with an alcohol.

10. The method of producing a synthetic resin which comprises first reacting components consisting of maleic anhydride and a terpene alcohol containing a tertiary hydroxyl group, and then reacting the condensation product so formed with a polyhydric alcohol.

11. A synthetic resin formed by the reaction of an aliphatic alcohol with the condensation product of maleic anhydride and a terpene alcohol containing a tertiary hydroxyl group.

12. A synthetic resin formed by the reaction of an aliphatic glycol with the condensation product of maleic anhydride and a terpene alcohol containing a tertiary hydroxyl group.

13. A synthetic resin formed by the reaction of ethylene glycol with the condensation product of maleic anhydride and a terpene alcohol containing a tertiary hydroxyl group.

14. A synthetic resin formed by the reaction of glycerol with the condensation product of maleic anhydride and a terpene alcohol containing a tertiary hydroxyl group.

15. A synthetic resin formed by the reaction of an aliphatic alcohol with the condensation product of maleic anhydride and alpha terpineol.

16. A synthetic resin formed by the reaction of an aliphatic glycol with the condensation product of maleic anhydride and alpha terpineol.

17. A synthetic resin formed by the reaction of an ethylene glycol with the condensation product of maleic anhydride and alpha terpineol.

18. A synthetic resin formed by the reaction of a glycerol with the condensation product of maleic anhydride and alpha terpineol.

19. A synthetic resin formed by the reaction of the condensation product of maleic anhydride and a terpene alcohol containing a tertiary hydroxyl group with an aliphatic polyhydric alcohol and a modifying agent selected from the group consisting of organic acids, natural resins and glyceride oils.

IRVIN W. HUMPHREY.